United States Patent
Doerr et al.

(10) Patent No.: US 7,343,066 B2
(45) Date of Patent: Mar. 11, 2008

(54) RECONFIGURABLE OPTICAL ADD/DROP MULTIPLEXER

(75) Inventors: Christopher Richard Doerr, Middletown, NJ (US); Jean Gerardus Leonardus Jennen, Huizen (NL)

(73) Assignee: Lucent Technologies Inc., Murray Hill, NJ (US)

( * ) Notice: Subject to any disclaimer, the term of this patent is extended or adjusted under 35 U.S.C. 154(b) by 123 days.

(21) Appl. No.: 11/204,624

(22) Filed: Aug. 16, 2005

(65) Prior Publication Data

US 2007/0053633 A1   Mar. 8, 2007

(51) Int. Cl.
G02B 6/26    (2006.01)
(52) U.S. Cl. .............. 385/27; 385/24; 398/83
(58) Field of Classification Search ............ None
See application file for complete search history.

(56) References Cited

U.S. PATENT DOCUMENTS

| | | | |
|---|---|---|---|
| 6,061,481 A * | 5/2000 | Heidrich et al. ......... 385/14 |
| 6,108,469 A * | 8/2000 | Chen ..................... 385/24 |
| 6,208,442 B1 * | 3/2001 | Liu et al. ................ 398/9 |
| 6,212,315 B1 | 4/2001 | Doerr | |
| 6,304,380 B1 | 10/2001 | Doerr | |
| 6,366,379 B1 * | 4/2002 | Terahara et al. ......... 398/213 |
| 6,493,488 B1 * | 12/2002 | Islam et al. ............. 385/47 |
| 6,574,413 B1 * | 6/2003 | Dieckroger ............. 385/140 |
| 6,810,168 B1 * | 10/2004 | Feng et al. ............. 385/24 |
| 7,236,704 B1 * | 6/2007 | Cao ........................ 398/83 |
| 2002/0044318 A1 * | 4/2002 | Hung ..................... 359/127 |
| 2003/0021535 A1 * | 1/2003 | Eldada et al. ........... 385/37 |
| 2003/0053754 A1 | 3/2003 | Doerr | |
| 2004/0247239 A1 * | 12/2004 | Eldada .................... 385/27 |

OTHER PUBLICATIONS

B. Bacque, D. Oprea, "Tropic Networks R-OADM Architecture Now You Can Control The Light", 2003, Tropic Networks Inc, month unknown.

* cited by examiner

Primary Examiner—Rodney Bovernick
Assistant Examiner—Mike Stahl

(57) ABSTRACT

A reconfigurable optical add/drop multiplexer (ROADM) includes a first optical dynamic gain equalization filter (DGEF) having a first input for receiving an initial wavelength division multiplexed (WDM) signal, a first output for sending a phase shifted WDM signal, and a second output connected to a demultiplexer for demultiplexing a WDM drop signal thereby producing a plurality of drop channels. A second DGEF having a first input for receiving the phase shifted WDM signal, a second input connected to a multiplexer, for multiplexing a plurality of add channels to produce thereby a wavelength division multiplexed (WDM) add signal, and an output for sending a second adjusted WDM signal. The ROADM allows for the channels from the initial WDM signal to be dropped, added and equalized.

21 Claims, 9 Drawing Sheets

RECONFIGURABLE OPTICAL ADD/DROP MULTIPLEXER

FIELD OF THE INVENTION

The invention relates generally to optical communications and, more particularly, to an arrangement suitable for adding and dropping channels in a wavelength division multiplexed (WDM) optical system.

BACKGROUND OF THE INVENTION

A dynamic gain equalization filter (DGEF) is a device or arrangement that is useful for controlling optical WDM channel powers, especially at the dispersion compensating module (DCM) port of an in-line amplifier (ILA) to provide the desired spectral flatness of the output channels. An example of a DGEF is described in U.S. Pat. No. 6,212,315 by C. R. Doerr et al. titled "Channel Power Equalization for a Wavelength Divisioned Multiplexed system," filed on Jul. 7, 1998, which is hereby incorporated by reference in its entirety.

FIG. 1 depicts a block diagram of a DGEF 100 for controlling channel powers in wavelength-division multiplexed (WDM) systems. In the DGEF 100 of FIG. 1, a decrease in attenuation range can be traded for a decrease in insertion loss. The WDM signal channels enter a coupler 102 from a left port 101. The coupler 102 splits the WDM signal into its signal components which are sent via upper and lower arms, 103 and 104 respectively. The output of the upper 103 and lower 104 arms are recombined in the second coupler 105 having the same splitting ratio as the first coupler 102. The upper arm 103 is a simple waveguide; while the lower arm 104 includes a wavelength selective phase shifter apparatus 104a comprising a demultiplexer 106 coupled to a multiplexer 107 via an array of programmable phase shifters 108. The number of phase shifters equals the number of channels in the WDM signal. In this illustrative example, the array of programmable phase shifters 108 includes four phase shifters; each programmable phase shifter is a device whose effective path length can be controlled externally via a control lead 111. Therefore, the phase of certain frequencies can be selectively varied to produce the desired output signals.

In an add/drop mode, port 121 is the add port and port 122 is the drop port. To throughput one or more wavelengths (or channels) from port 101 to port 109, the phase shift of phase shifter 104a must be 180 degrees for the throughput wavelength(s). Thus, if more than one wavelength (or channel) is to be throughput the phase shift of phase shifter 104a must be 180 degrees for each of those wavelengths. In contrast, to drop or cross-connect one or more wavelengths from port 101 to port 122, the phase shift of phase shifter 104a must be 0 degrees for that wavelength. This means that wavelength does not appear at port 109.

If more than one wavelength (or channel) is to be dropped the phase shift of phase shifter 104a must be 0 degrees for each of those wavelengths to be dropped. This cross-connect mode also enables a new wavelength (or channel) to be added at port 121 and appear at port 109 along with the throughput wavelengths from port 101. If more than one wavelength (or channel) is to be added, they are added at port 121 and appear at port 109. The phase shift of phase shifter 104a must be 0 degrees for the more than one added wavelength. Due to its symmetric nature, one can make a reflective arrangement by cutting the device in half with a mirror placed along the axis of symmetry.

The transfer function of the DGEF 100 is reflected by the following equations:

$$E_{OUT}/E_{IN}=R-(1-R)e^{j\phi}\sqrt{T} \Rightarrow$$

$$P_{OUT}/P_{IN}=[R-(1-R)\cos(\phi)\sqrt{T}]^2+[(1-R)\sin(\phi)\sqrt{T}]^2=$$

$$R^2+(1-R)^2T-2R(1-R)\cos(\phi)\sqrt{T} \quad (1)$$

where $E_{OUT}$, $P_{OUT}$ and $E_{IN}$, $P_{IN}$ represent the electrical field and power of the complex envelope of an optical signal at the DGEF output and input (109, 101) respectively;

R reflects the coupler ratio ($R \in [0,1]$);

T is the power transmission of the phase shift section 104a, where ($T \in [0,1]$); and $\phi$ is the per channel relative phase change induced in the lower arm 104.

When T is known, selection of an appropriate value for R offers a trade-off between the dynamic range and the maximum transmission of the DGEF 100.

Unfortunately, it is a challenge to find a cost-effective solution for an in-service upgradeable in-line amplifier (ISUGILA) towards a reconfigurable optical add/drop multiplexer (ROADM).

SUMMARY

Various deficiencies of the prior art are addressed by the present invention of system method and apparatus for equalizing and add/dropping optical channels within an optical communications network using, illustratively, two cascading gain equalizing filters. The first gain equalizing filter, for processing a wavelength division multiplexed (WDM) input signal to provide thereby a first component WDM drop signal and a second component WDM drop signal. The second gain equalizing filter, for processing the first component WDM drop signal and a WDM add signal to provide thereby a WDM output signal.

Another embodiment for an optical add/drop multiplexer (OADM) includes a first and second coupler and a gain equalizing filter. The first coupler splits a wavelength division multiplexed (WDM) add signal into a first component WDM add signal and a second component WDM add signal. The gain equalizing filter processes a WDM input signal and the first component WDM add signal to provide thereby a first component WDM output signal and second component WDM output signal. The second coupler combines the second component WDM output signal and the second component WDM add signal to produce a WDM drop signal.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION OF THE INVENTION

The invention will be primarily described within the context of an in-line optical amplifier; however, those skilled in the art and informed by the teachings herein will realize that the invention is also applicable to any optical transmission system that employs gain equalization and add/drop functions.

Figure 1:
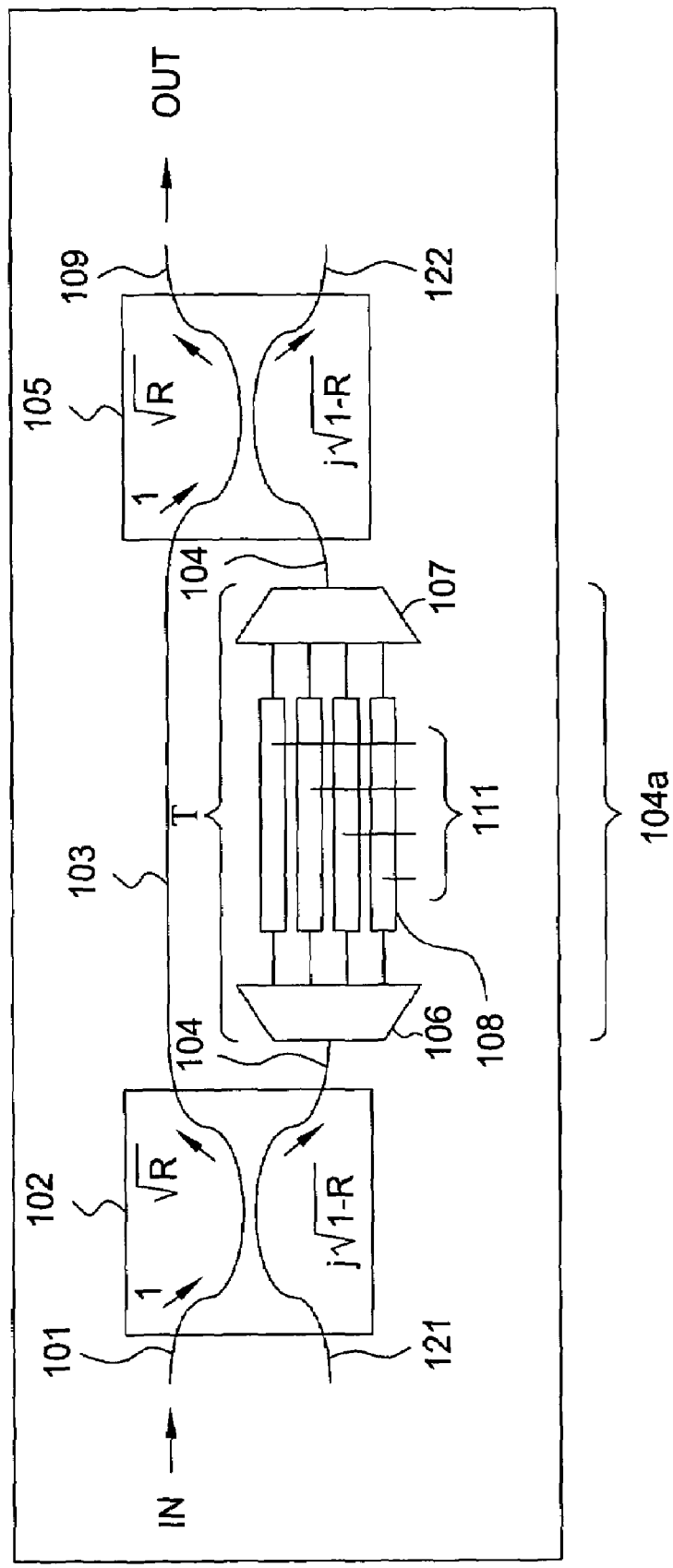
FIG. 1 depicts a block diagram of a prior art dynamic gain equalization filter (DGEF)
Figure 2:
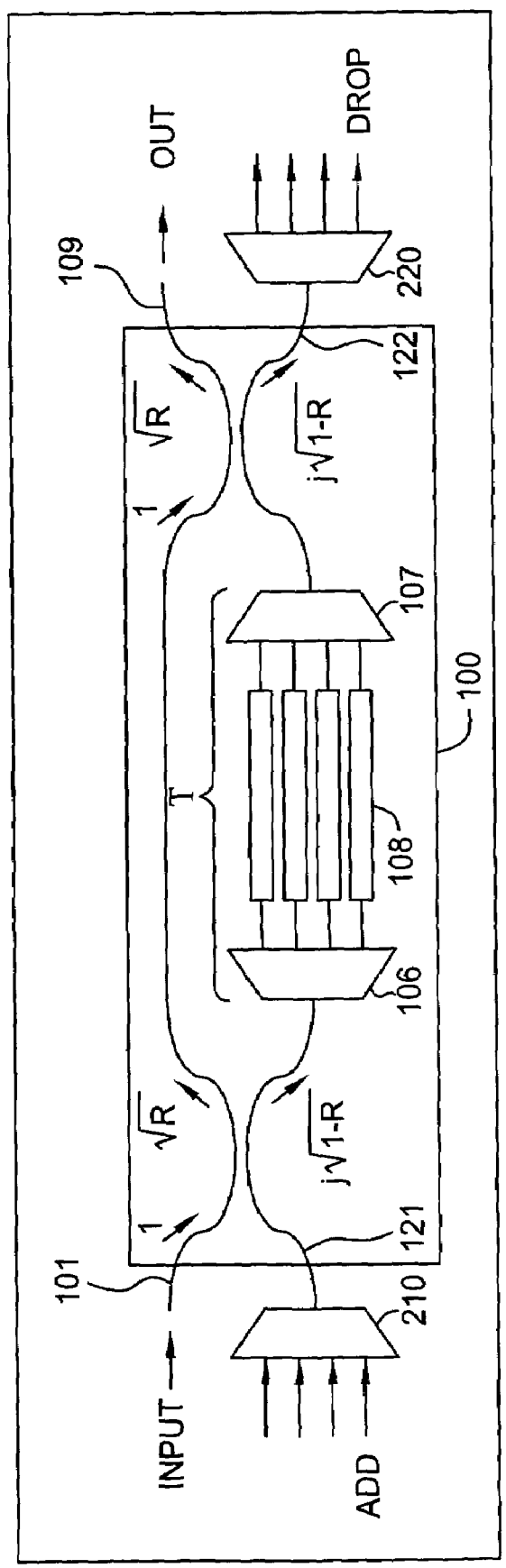
FIG. 2 depicts a block diagram of a reconfigurable optical add/drop multiplexer (ROADM)

FIG. 2 depicts a block diagram of a reconfigurable optical add/drop multiplexer (ROADM). Specifically, the ROADM of FIG. 2 comprise an optical multiplexer 210, the DGEF 100, and a demultiplexer 220. The DGEF of 100 of FIG. 2 may be implemented in substantially the same manner as the DGEF 100 discussed with respect to FIG. 1.

The DGEF 100 in FIG. 1 has two unused ports 121 and 122. The ROADM of FIG. 2 connects the optical multiplexer 210 to the unused input port 121 of the DGEF 100. The unused output port 122 of the DGEF 100 is connected to the demultiplexer 220. A plurality of optical channels is multiplexed at multiplexer 210 and inputted to the DGEF 100. Depending on the mode of operation of the DGEF, a multiplexed optical signal could be outputted from output 122, and the plurality of optical channels is demultiplexed at demultiplexer 220 where the channels are dropped.

The optical multiplexer 210 and demultiplexer 220 can be implemented using two waveguide grating routers connected to optical ports 121 and 122. The channels can also be multiplexed and demultiplexed on a waveband level using waveband filters. Cascades of thin film filters can be used to separate all or just a few channels from the add/drop bundles. In this configuration, no expensive optical switching elements are required to have the in-line amplifier also perform the functions of an add/drop multiplexer.

The transfer function (disregarding the insertion loss of the Add multiplexer 210 and Drop demultiplexer 220) between add and drop ports (121, 122) are governed by the following equations:

$$E_{DROP}/E_{ADD} = Re^{j\phi}\sqrt{T}-(1-R) \Rightarrow$$

$$P_{DROP}/P_{ADD} = [R\cos(\phi)\sqrt{T}-(1-R)]^2 + [R\sin(\phi)\sqrt{T}]^2 =$$

$$(1-R)^2 + R^2 T - 2R(1-R)\cos(\phi)\sqrt{T} \quad (2)$$

where $E_{DROP}$, $P_{DROP}$ and $E_{ADD}$, $P_{ADD}$ represent the electrical field and power of the complex envelope of an optical signal at the DGEF drop and add ports 122, 121 respectively. The power ratios in Equations (1) and (2) reach a minimum for $\phi=0$ and a maximum for $\phi=\pi$. For ROADM operation, both ratios should reach 0 when a channel is switched to add/drop mode, i.e. $\phi=0$. Using Equations (1) and (2) we arrive at $$R = \frac{\sqrt{T}}{1+\sqrt{T}} \text{ or } \sqrt{T} = \frac{R}{1-R} \quad (3)$$

(3)
to satisfy the condition $P_{OUT}/P_{IN}|_{\phi=0}=0$, and $$R = \frac{\sqrt{T}}{1+\sqrt{T}} \text{ or } \sqrt{T} = \frac{1-R}{R} \quad (4)$$

to satisfy the condition $P_{DROP}/P_{ADD}|_{\phi=0}=0$. Both conditions can only be met simultaneously when T=1, which is of little practical value; more realistic values for T are 0.5 and below. Satisfying only a single condition results either in residual power of drop channels appearing at the output or in add channel power appearing at the drop port. Nevertheless, the device can be used for only add or only drop mode of operation.

Figure 3:
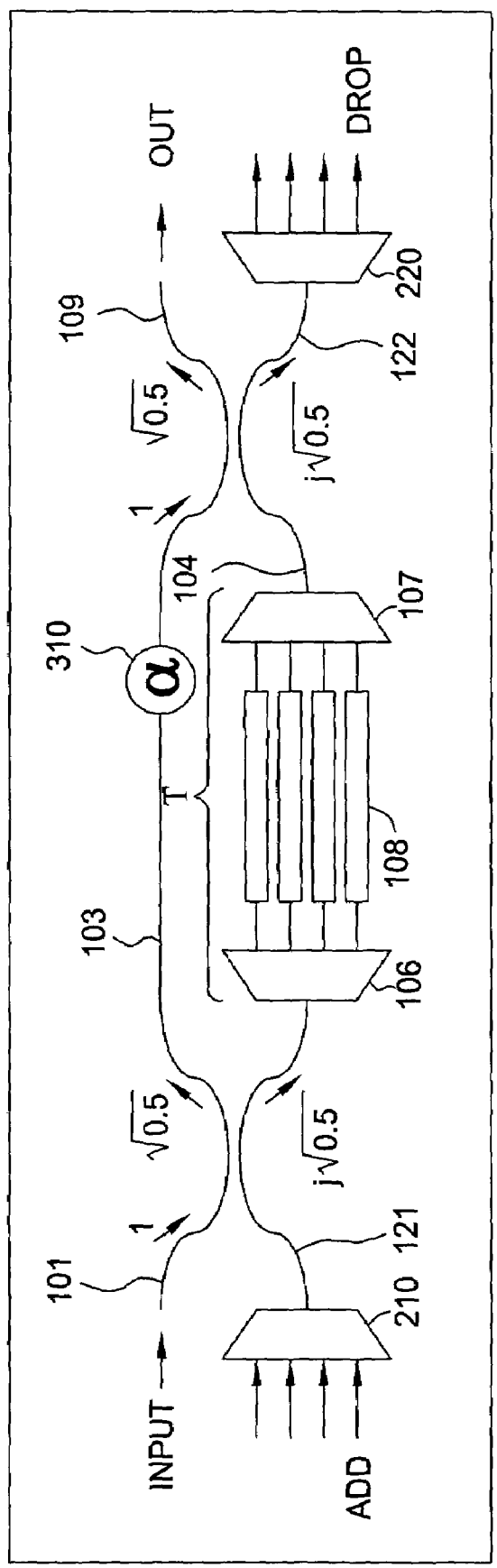
FIG. 3 depicts a block diagram of an alternative ROADM.

FIG. 3 depicts a block diagram of an alternative ROADM. This embodiment allows for full operation as ROADM while counteracting the undesired crosstalk effect. As shown in FIG. 3, an attenuator 310 is added to the upper arm 103 of the DGEF 100 of FIG. 2. Selecting R=0.5 and adding the attenuator 310 in the upper arm with α=T provides the desired power blocking between input 101 and output 109, and between add port 121 and drop port 122. However, the embodiment of FIG. 3 has additional overall loss compared to the embodiment of FIG. 2.

Without attaching the multiplexer 210 and demultiplexer 220, the embodiment of FIG. 3 can also be used as a reconfigurable 2×2 optical cross connect. However, no equalization can be performed simultaneously as add/drop is being performed.

Figure 4:
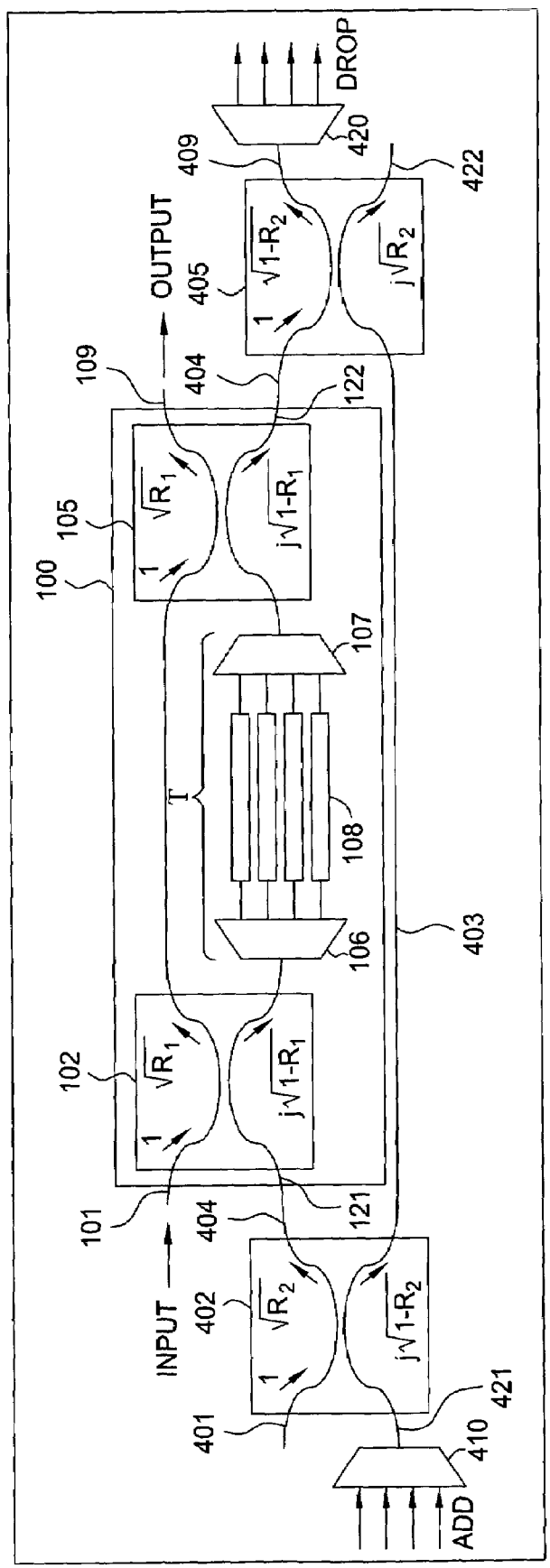
FIG. 4 depicts a block diagram of an alternative ROADM.

FIG. 4 depicts a block diagram of an alternative ROADM. This embodiment allows for full operation while counteracting the undesired crosstalk effect. This embodiment includes an optical multiplexer 410, a third optical coupler 402, an lower arm 403, an upper arm 404 with DGEF 100, a fourth optical coupler 405 and an optical demultiplexer 420.

The optical multiplexer 410 is connected to the lower left port 421 of the third optical coupler 402. The upper right port of the third coupler 402 is connected to the lower left port, also known as the add port 121, of the DGEF 100. The lower right port of the third optical coupler 402 is connected to the lower left port of the fourth coupler 405 through optical arm 403. The upper left port of the fourth coupler 405 is connected to the drop port 122 of the DGEF 100 through optical arm 404. The upper right port 409 of the fourth coupler 405 functions as the drop port and is connected to the demultiplexer 420. Ports 401 and 422 are dummy ports which are not connected.

Couplers 402, 405 can be of many types, including Y-branch couplers, directional couplers, star couplers, and multimode interference couplers. Other types of couplers can also be used as long as no additional phase difference between the branches is introduced by coupler 402 and 405.

The multiplexer 410 adds a plurality of optical input channels and outputs a signal with WDM signal channels. The WDM signal channels enter the third coupler 402 from the lower left port 421 of the third coupler 402. The third coupler 402 splits the WDM signal into its signal components which are sent to the upper and lower arms, 404 and 403, respectively. The lower arm 403 is a simple waveguide. The upper arm 404 includes the DGEF 100 which contains two couplers 102 and 105, a demultiplexer 106 and multiplexer 107 connected by an array of programmable phase shifters 108. The DGEF 100 of FIG. 4 functions substantially the same as the DGEF 100 described above in FIG. 1. Therefore, it is able to perform equalization or add/drop of the signal entering from input port 101 as well as from the add port 121. The signals to be dropped will pass through upper arm 404 to the upper left port of the fourth coupler 405 which will be combined with the component on the lower arm 403 which is connected to the lower left port of the fourth coupler 405. That combined signal will be outputted to the demultiplexer 420 connected to the upper right port 409. The demultiplexer demultiplexes that WDM signal and drops the plurality of channels. In one embodiment, the third and fourth couplers are Y-branch couplers because then the device can be cut in half with a mirror places along the axis of symmetry.

In this embodiment, the operation of the DGEF/ROADM regarding power transmission is now characterized by the following equations:

$$E_{OUT}/E_{IN} = R_1 - (1-R_1)e^{j\phi}\sqrt{T} \Rightarrow$$

$$P_{OUT}/P_{IN} = [R_1 - (1-R_1)\cos(\phi)\sqrt{T}]^2 + [(1-R_1)\sin(\phi)\sqrt{T}]^2 =$$

$$R_1^2 + (1-R_1)^2 T - 2R_1(1-R_1)\cos(\phi)\sqrt{T} \quad (5)$$

$$E_{DROP}/E_{IN} = j[\sqrt{R_1(1-R_1)} + e^{j\phi}\sqrt{R_1(1-R_1)T}]\sqrt{1-R_2} \Rightarrow$$

$$P_{DROP}/P_{IN} = R_1(1-R_1)(1-R_2)\{[1+\cos(\phi)\sqrt{T}]^2 + [\sin(\phi)\sqrt{T}]^2\} =$$

$$R_1(1-R_1)(1-R_2)[1+T+2\cos(\phi)\sqrt{T}] \quad (6)$$

$$E_{OUT}/E_{ADD} = -[\sqrt{R_1(1-R_1)} + e^{j\phi}\sqrt{R_1(1-R_1)T}]\sqrt{1-R_2} \Rightarrow$$

$$P_{OUT}/P_{ADD} = R_1(1-R)(1-R_2)\{[1+\cos(\phi)\sqrt{T}]^2 + [\sin(\phi)\sqrt{T}]^2\} =$$

$$R_1(1-R_1)(1-R_2)[1+T+2\cos(\phi)\sqrt{T}] \quad (7)$$

$$E_{DROP}/E_{ADD} = jR_2 + j[R_1 e^{j\phi}\sqrt{T} - (1-R_1)](1-R_2) \Rightarrow$$

$$P_{DROP}/P_{ADD} = [R_2 + (1-R_2)\{R_1\cos(\phi)\sqrt{T} - (1-R_1)\}]^2 + [(1-R_2)R_1\sin(\phi)\sqrt{T}]^2 =$$

$$[(1-R_1)(1-R_2)-R_2]^2 + R_1^2(1-R_2)^2 T - 2R_1(1-R_2)[(1-R_1)(1-R_2)-R_2]\cos(\phi)\sqrt{T} \quad (8)$$

Applying the conditions $P_{OUT}/P_{IN}|_{\phi=0} = 0$ and $P_{DROP}/P_{ADD}|_{\phi=0} = 0$ to Equations (5) and (8) now yields $$R_1 = \frac{\sqrt{T}}{1+\sqrt{T}} \text{ or } \sqrt{T} = \frac{R_1}{1-R_1} \quad (9)$$

$$R_2 = \frac{1-\sqrt{T}}{2-\sqrt{T}} \text{ or } 1-\sqrt{T} = \frac{R_2}{1-R_2} \quad (10)$$

As $T\in[0,1]$ then according to Equations (9) and (10), $R_1, R_2 \in [0,\frac{1}{2}]$. In this case, the loss between input and output is optimized whereas add and drop ports encounter additional losses that are limited to 3 dB each, namely $-10 \cdot {}^{10}\log(1-R_2)$.

To illustrate the operation of the DGEF/ROADM, let us consider the following example, where $T=\frac{1}{2}$.

TABLE 1

Transmission values between input/add port and output/drop port for $T = \frac{1}{2}$ (−3.0 dB), equivalent dB values are given in parentheses

| | Output | | Drop port | |
|---|---|---|---|---|
| | $\phi = 0$ | $\phi = \pi$ | $\phi = 0$ | $\phi = \pi$ |
| Input | 0 (−∞) | 0.686 (−1.63) | 0.547 (−2.62) | 0.0161 (−17.9) |
| Add port | 0.547 (−2.62) | 0.0161 (−17.9) | 0 (−∞) | 0.205 (−6.88) |

Note:
insertion losses of the multiplexer and demultiplexer at the add and drop ports are disregarded.

When in equalizer mode, add port 421 and drop port 422 are idle, and the loss between input 101 and output 109 can be tuned by adjusting $\phi$. The maximum and minimum losses attainable are −∞ dB and −1.63 dB, respectively. In add/drop mode, however, $\phi$ will be set to 0. In that case, full power blocking is achieved between input 101 and output 109, and between add port 421 and drop port 422, while power transfer is maximized from add port 421 to output 109 and from input 101 to drop port 409. The values provided in hold for the ideal case. In a practical realization, however, manufacturing tolerances limit the dropped channel extinction ratio to about 30 dB in contrast to full extinction in the ideal case.

Figure 5A:
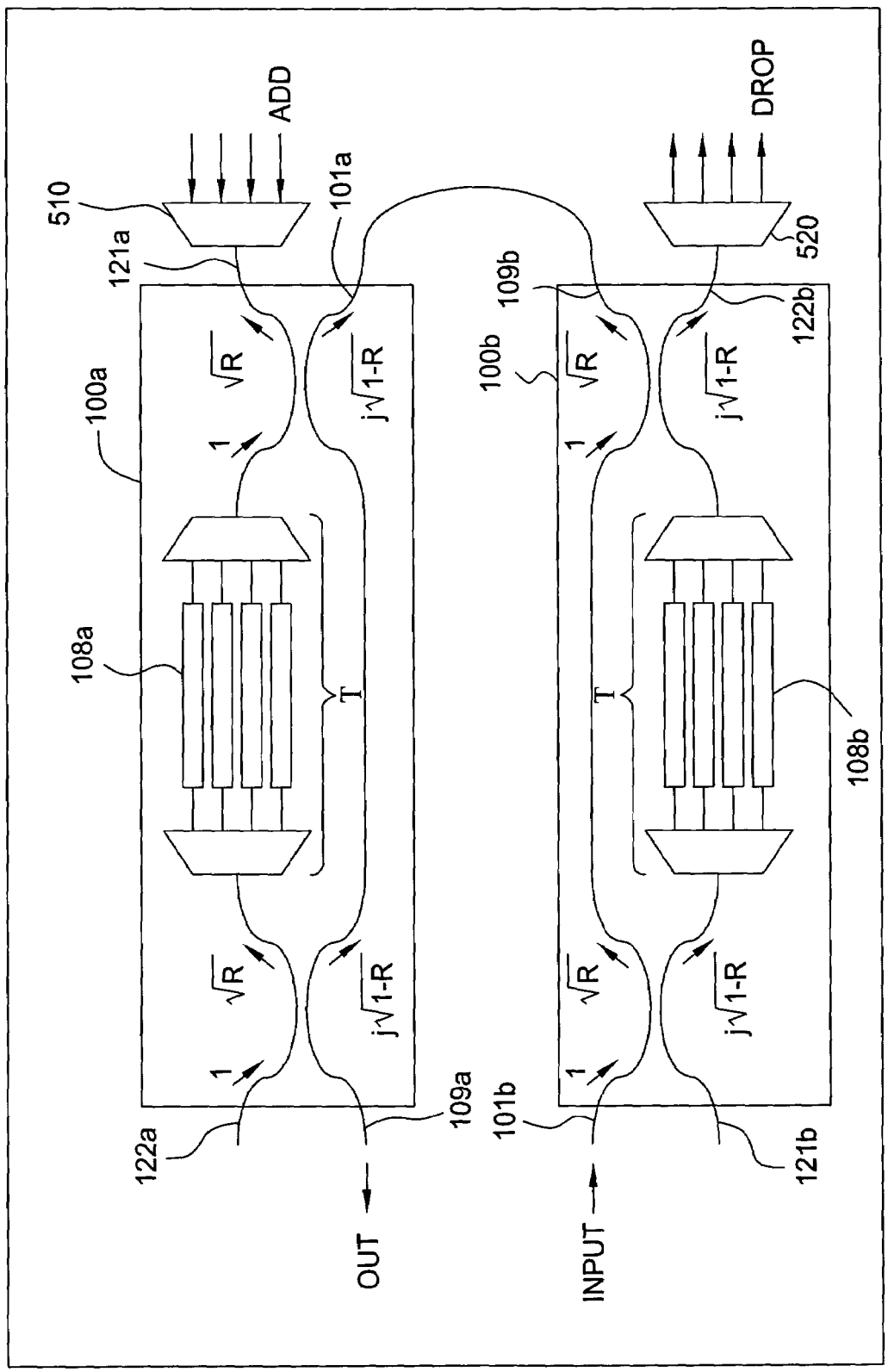
FIG. 5a depicts a block diagram of a dual-stage design of a combined DGEF/ROADM.

FIG. 5a depicts a block diagram of a dual-stage design of a combined DGEF/ROADM. By cascading two DGEF's from FIG. 1 as is illustrated in FIG. 5, the required 40 dB is obtained. Each DGEF functions substantially the same as the DGEF described in FIG. 1. FIG. 5a includes a first DGEF 100b, a second DGEF 100a, an optical multiplexer 510 and an optical demultiplexer 520.

In the embodiment of FIG. 5a, the first DGEF 100b including a phase shifter 108b is cascaded with the second DGEF 100a including a phase shifter 108a through an optical connection between an output port 109b of the first DGEF 100b and an input port 101a of the second DGEF 100a. This arrangement results in six available ports: optical input port 101b, optical output port 109a, optical add port 121a, optical drop port 122b, and two dummy optical ports (121b, 122a) that remain idle.

The input port 101b is for inputting an optical signal. The optical add port 121a is connected to an optical multiplexer 510 which allows for the addition of a plurality of channels. The optical multiplexer 510 functions substantially the same as the multiplexer 210 and 410 described above. The optical drop port 122b is connected to a demultiplexer 520 which allows for the dropping of a plurality of channels. The optical demultiplexer 520 functions substantially the same as the demultiplexer 220 and 420 described above. In an embodiment, both corresponding phase shifters (108a, 108b) will be adjusted simultaneously for each individual wavelength channel. The simultaneous adjustment of the phase shifters will limit the necessary control electronics of the system. Optionally, the phase shifter 108a or 108b can have an offset of 180 degrees predetermined phase shift at zero heating.

Some advantages of the embodiment of FIG. 5a are double dropped channel extinction ratio; full add and drop port separation; east-west separability; and reduced losses between add port and output and between input and drop port. On the other hand, some drawbacks are double minimum loss between input and output in equalization mode; and double heater power consumption for controlling of the phase shifters.

The power transmission between the output port 109a and input port 101b of the dual-stage design is governed by the following equations:

$$E_{OUT}/E_{IN} = \left[R - (1-R)e^{j\phi}\sqrt{T}\right]^2 \Rightarrow \quad (11)$$

$$P_{OUT}/P_{IN} = \left[\left[R - (1-R)\cos(\phi)\sqrt{T}\right]^2 + \left[(1-R)\sin(\phi)\sqrt{T}\right]\right]^2$$

$$= \left[R^2 + (1-R)^2 T - 2R(1-R)\cos(\phi)\sqrt{T}\right]^2$$

$$E_{DROP}/E_{IN} = E_{OUT}/E_{ADD} \quad (12)$$

$$= j\left[\sqrt{R(1-R)} + e^{j\phi}\sqrt{R(1-R)T}\right] \Rightarrow$$

$$P_{DROP}/P_{IN} = P_{OUT}/P_{ADD}$$

$$= R(1-R)\left\{\left[1 + \cos(\phi)\sqrt{T}\right]^2 + \left[\sin(\phi)\sqrt{T}\right]^2\right\}$$

$$= R(1-R)\left[1 + T + 2\cos(\phi)\sqrt{T}\right]$$

$$E_{DROP}/E_{ADD} = 0 \Rightarrow \quad (13)$$
$$P_{DROP}/P_{ADD} = 0$$

$$R = \frac{\sqrt{T}}{1+\sqrt{T}} \text{ or } \sqrt{T} = \frac{R}{1-R} \quad (14)$$

For the example case T=½, the transmission values at the extremes are summarized in Table 2.

TABLE 2

Transmission values of the dual-stage concept between input/add port and output/drop port for T = ½ (−3.0 dB), equivalent dB values are given in parentheses

| | Output | | Drop port | |
|---|---|---|---|---|
| | φ = 0 | φ = π | φ = 0 | φ = π |
| Input | 0 (−∞) | 0.471 (−3.27) | 0.707 (−1.51) | 0.0208 (−16.8) |
| Add port | 0.707 (−1.51) | 0.0208 (−16.8) | 0 (−∞) | 0 (−∞) |

Note:
insertion losses of the multiplexer and demultiplexer at the add and drop ports are disregarded.

Figure 5B:
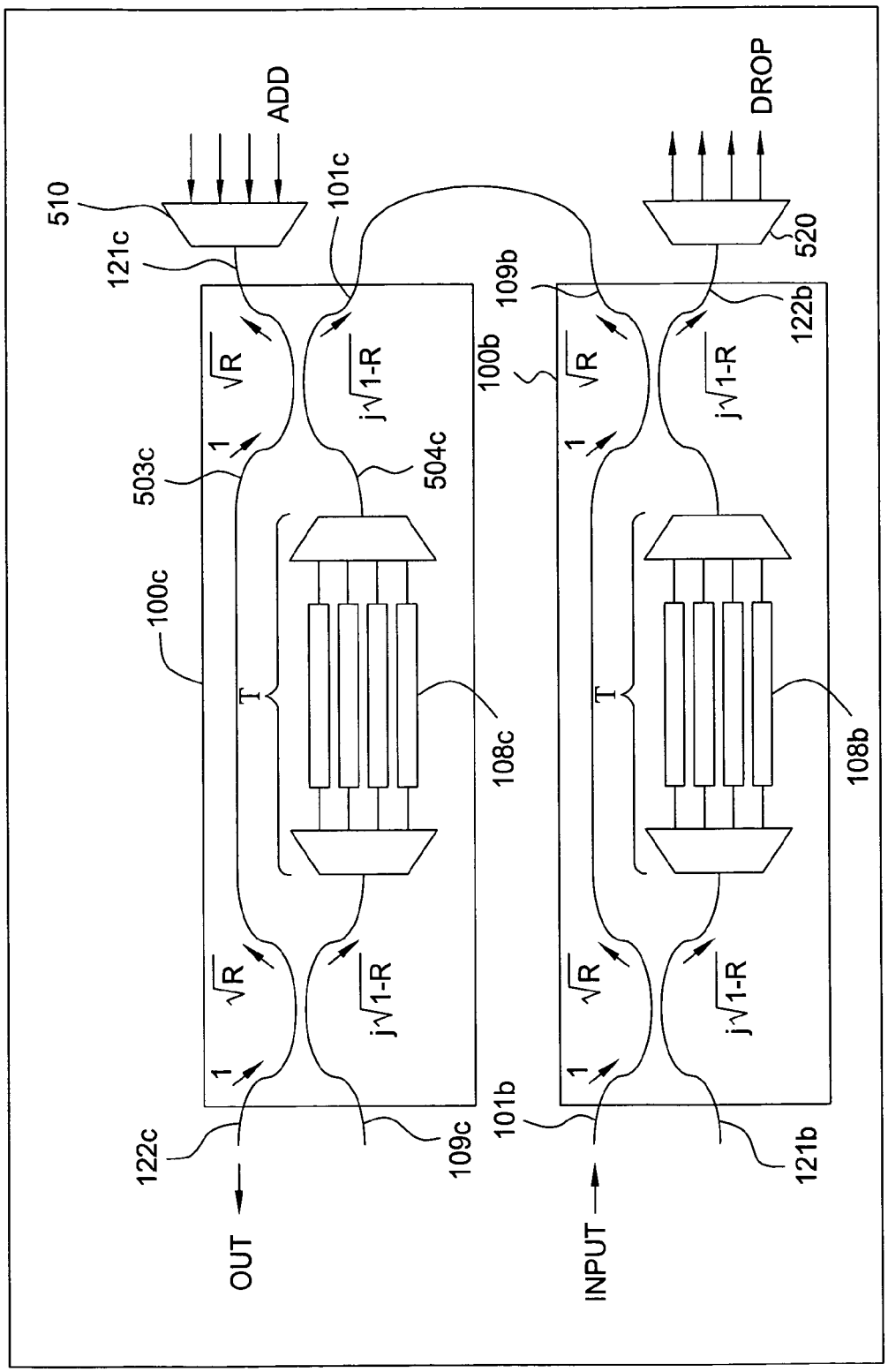
FIG. 5b depicts a block diagram of an alternative dual-stage design of a combined DGEF/ROADM.

FIG. 5b depicts a block diagram of an alternative dual-stage design of a combined DGEF/ROADM. This variation will reduce the power consumption. The embodiment of FIG. 5b is substantially the same as FIG. 5a except the second DGEF 100a is replaced by a third DGEF 100c. The variation of FIG. 5b is that the phase shifters 108c are located on the lower arm 504c thereby leaving arm 503c as a simple waveguide. In this embodiment, the output is located at port 122c instead of 109c. It is an optional mode of operation to adjust the power level with only phase shifter 108b in this embodiment.

Figure 5C:
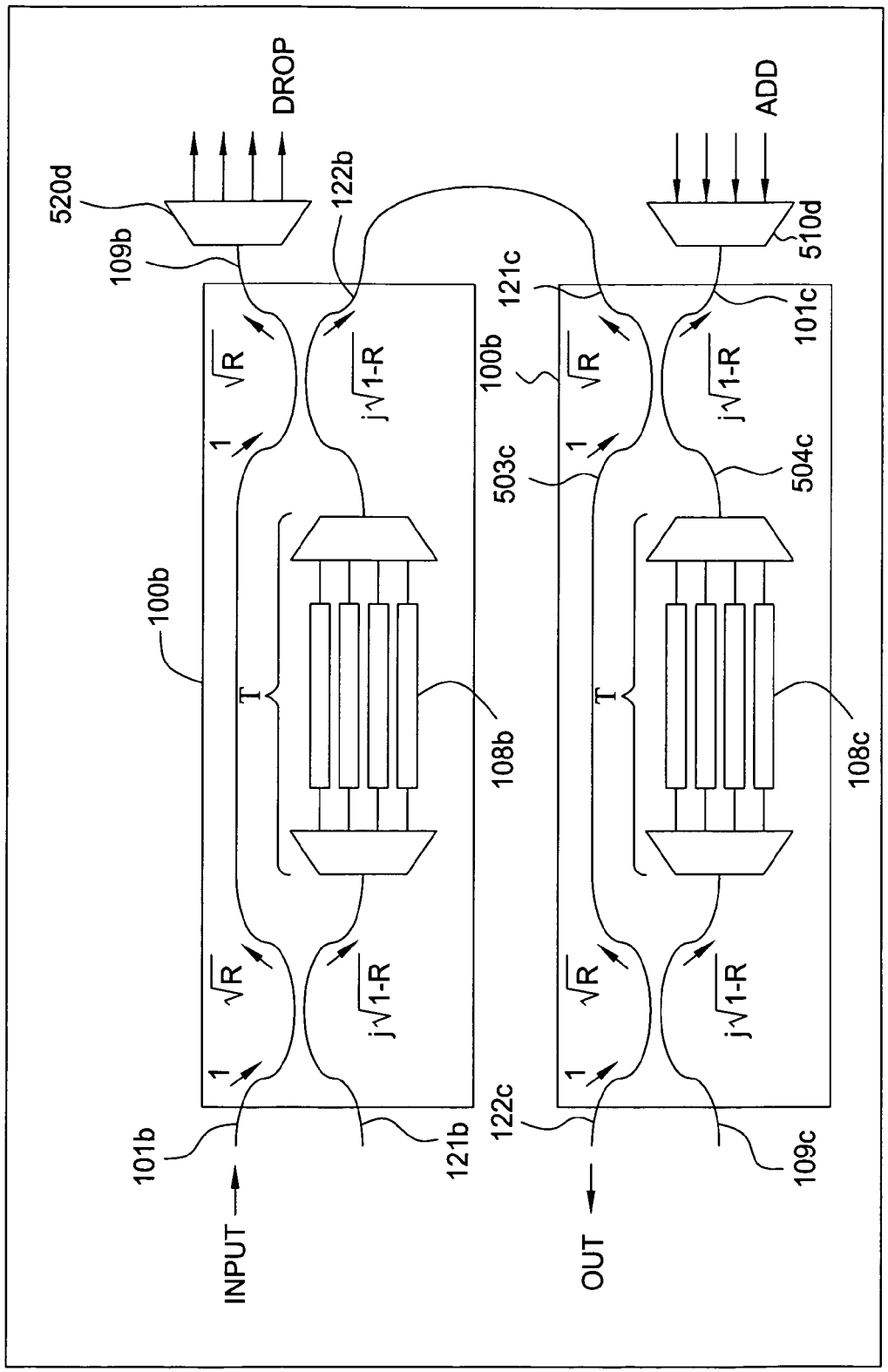
FIG. 5c depicts a block diagram of an alternative dual-stage design of a combined DGEF/ROADM.

FIG. 5c depicts a block diagram of an alternative dual-stage design of a combined DGEF/ROADM. The embodiment of FIG. 5c is another variation based on FIG. 5b where the two DGEFs are cascaded with a waveguide between ports 122b and 121c. The add multiplexer 510d substantially similar to the add multiplexer 510 is connected to port 101c. The drop multiplexer 520d which functions substantially similar to drop multiplexer 520 is connected to port 109b. In this embodiment, an optional mode of operation includes using only phase shifter 108c to adjust the power. Another way of looking at the embodiment of FIG. 5c is that FIG. 5b and FIG. 5C are reciprocals of each other. Specifically, the output and input are interchanged and add and drop are switched.

Figure 6:
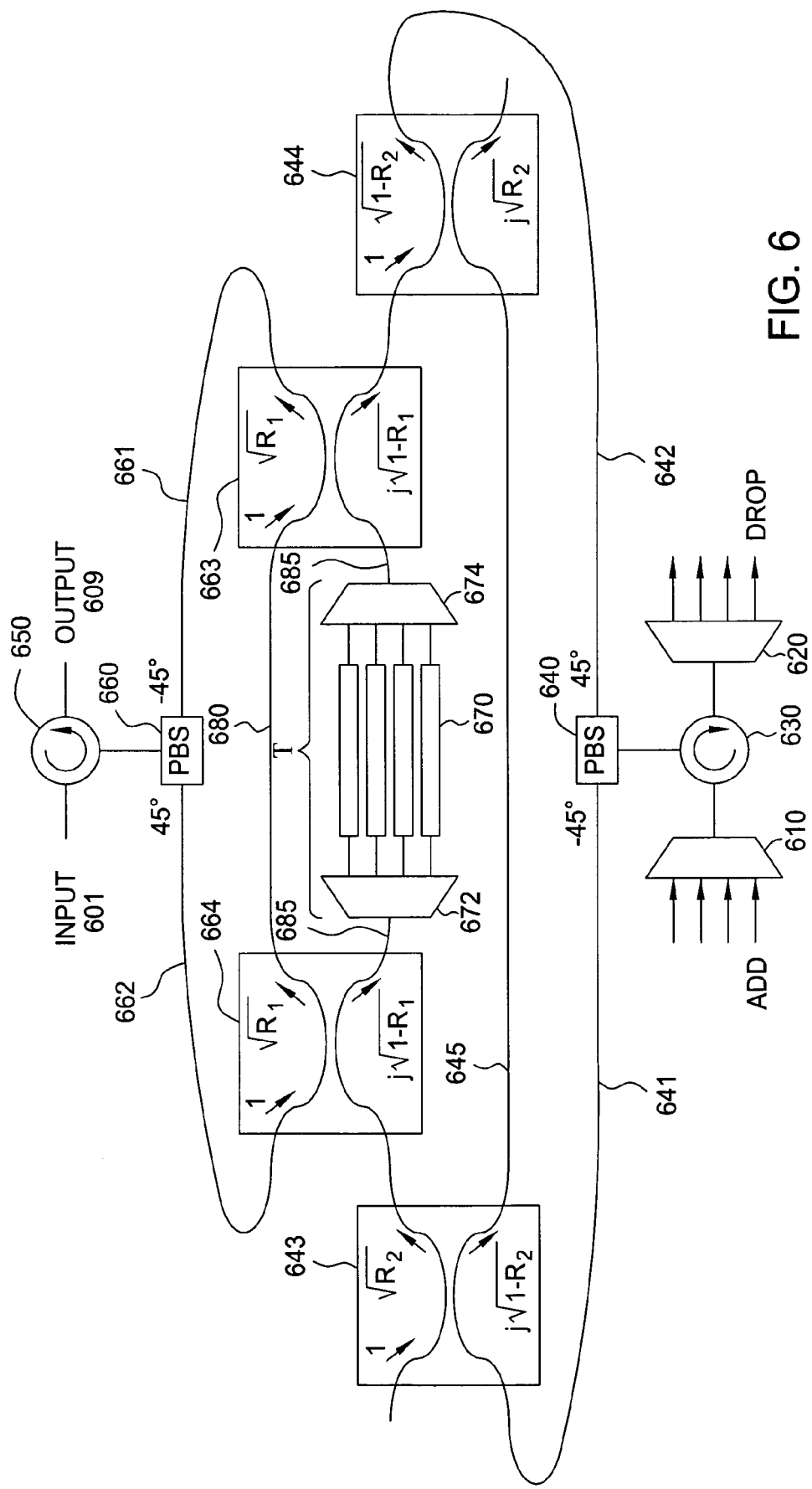
FIG. 6 depicts a block diagram of a combined DGEF/ROADM.

FIG. 6 depicts a block diagram of a combined DGEF/ROADM. The embodiment of FIG. 6 is another way to reach the required dropped channel extinction ratio. In the embodiment as shown in FIG. 6, the combined DGEF/ROADM comprises a counter-clockwise circulator 650, a first polarization beam splitter (PBS) 660, polarization rotators 670, a fifth coupler 643, a sixth coupler 644, a seventh coupler 664, an eighth coupler 663, a second PBS 640, a clockwise circulator 630, an optical multiplexer 610 for adding a plurality of optical channels and an optical demultiplexer 620 for dropping a plurality of optical channels.

An output 609, an input 601, and the first polarization beam splitter (PBS) 660 are connected in that order to a counter-clockwise circulator 650. The input is sent to the first PBS. The PBS splits the received optical signal into two signals separated by 90 degrees and transmits them to the seventh 664 and eighth 663 couplers. The signals received from the seventh and eighth couplers are combined and sent to the counter-clockwise circulator to the output 609.

The upper left port of the seventh coupler 664 is connected through fiber 662 to the left port of the first PBS, and the upper right port of the eighth coupler 663 through fiber 661 is connected to the right port of the first PBS. The upper left port of the eighth coupler 663 and the upper right port of the seventh coupler 664 are connected by an upper arm 680. The lower left port of the eighth coupler 663 and the lower right port of the seventh coupler 664 are connected by a lower arm 685 that includes a multiplexer 674, demultiplexer 673 and polarization rotators 670. The lower arm 685 functions similarly to the lower arm 104 of FIG. 1 except the signals are controlled by rotating the polarization instead of shifting the phase.

The fifth coupler 643 has 4 ports. The upper left port is a dummy port. The lower left port is connected to the second PBS 640. The upper right port of the fifth coupler 643 is connected to the lower left port of the seventh coupler 664. The lower right port of the fifth coupler 643 is connected via fiber 645 to the lower left port of the sixth coupler 644.

The sixth coupler 644 functions substantially the same as the fifth coupler 643. In addition to the fiber connection of the fifth coupler 643 via the lower left port, the upper left port is connected to the lower right port of eighth coupler 663. The lower right port of the sixth coupler is a dummy port. The upper right port of the sixth coupler 644 is connected to the second PBS 640 via fiber 642.

The second PBS 640 has 3 ports. The left port of the second PBS 640 is connected to the fifth coupler 643 by fiber 641, and the sixth coupler 644 is connected to the right port of the second PBS through fiber 642 as described above. The left and right ports of the second PBS are separated by 90 degrees. For signals received from the clockwise circulator 630 at the second PBS, two signals will be transmitted on the right and left ports separated by 90 degrees. Similarly, the signals received from the fibers will be combined and transmitted from the third port of the PBS to the clockwise circulator 630 to be circulated for dropping channels at demultiplexer 620.

The clockwise circulator 630 circulates the signals from the multiplexer 610 for adding optical channels, third port of the second PBS 640, and the demultiplexer 620 for dropping channels, respectively. The clockwise circulator 630 therefore allows for the add channels at the multiplexer 610 to be transmitted to the third port of the second PBS 640 and the signals at the third port of the second PBS 640 to be circulated to the drop ports of the demultiplexer 620.

The design as indicated in FIG. 6 results in the separation of the add signals from the multiplexer 610 and input 601 into two orthogonally polarized signals that counter-propagate through the structure of FIG. 6. After propagation, parts of the signals will be recombined by the PBS's 640, 660 and appear via the optical circulators 630, 650 at the output 609 and/or drop ports 620, respectively, depending on the applied polarization rotation at the polarization rotators 640.

Signals leaving from one PBS at either polarization are blocked by the same PBS after propagation through the structure, and directed to the output 609 or drop port 621 by the other PBS. However, when polarization rotation is applied, the signals are divided over both the output 609 and drop 621 port. Coupling of the orthogonal polarization states to the +45 and −45 degree angles with respect to the horizontal axis of the waveguides is chosen to assure polarization independent behavior of the design. In theory, any two angles with a difference of 90 degrees are permitted.

Introducing vector notation for the electrical field of the optical signals, the operation of the DGEF/ROADM from FIG. 6 can now be described by the following equations:

$$\vec{E}_{OUT} = (1-R_1)\sin(\Theta)\sqrt{T}\begin{bmatrix} 0 & 1 \\ -1 & 0 \end{bmatrix}\vec{E}_{IN} \Rightarrow \quad (15)$$

$$P_{OUT}/P_{IN} = (1-R_1)^2 T \sin^2(\Theta)$$

$$\vec{E}_{DROP}\big|\vec{E}_{OUT} = \sqrt{R_1(1-R_1)(1-R_2)}\,(1+\cos(\Theta)\sqrt{T}) \quad (16)$$

$$\begin{bmatrix} -1 & 0 \\ 0 & j \end{bmatrix}\vec{E}_{IN}\big|\vec{E}_{ADD} \Rightarrow$$

$$P_{DROP}/P_{IN} = P_{OUT}/P_{ADD}$$

$$= R_1(1-R_1)(1-R_2)\big[1+\cos(\Theta)\sqrt{T}\,\big]^2$$

$$\vec{E}_{DROP} = jR_1(1-R_2)\sin(\Theta)\sqrt{T}\begin{bmatrix} 0 & 1 \\ -1 & 0 \end{bmatrix}\vec{E}_{ADD} \Rightarrow \quad (17)$$

$$P_{DROP}/P_{ADD} = R_1^2(1-R_2)^2 T \sin^2(\Theta)$$

$$R_1 = \frac{\sqrt{T}}{1+\sqrt{T}} \text{ or } \sqrt{T} = \frac{R_1}{1-R_1} \quad (18)$$

$$R_2 = \frac{1-\sqrt{T}}{2-\sqrt{T}} \text{ or } 1-\sqrt{T} = \frac{R_2}{1-R_2} \quad (19)$$

In the equations above (15 through 17), Θ represents the angle of polarization rotation. The electrical fields and respective optical powers are defined as $$\vec{E}_X \equiv \begin{bmatrix} E_{X,-45} \\ E_{X,+45} \end{bmatrix}, P_X \equiv \big|\vec{E}_X\big|^2 = |E_{X,-45}|^2 + |E_{X,+45}|^2, \quad (20)$$

where $E_{X,-45}$ and $E_{X,+45}$ are the electrical fields of the respective −45° and +45° polarization states.

An advantage is the additional dropped channel extinction of about 20 dB (cross talk between the two states of polarization at the PBS). The major drawback to be mentioned is the additional 6 dB loss between input and output in DGEF mode. For the situation T=½, the transmission values at the extremes are summarized in Table 3.

TABLE 3

Transmission values of the polarization-based concept between input/add port and output/drop port for T = ½ (−3.0 dB), equivalent dB values are given in parentheses

| | Output | | Drop port | |
|---|---|---|---|---|
| | Θ = 0 | Θ = π/2 | Θ = 0 | Θ = π/2 |
| Input | 0 (−∞) | 0.172 (−7.66) | 0.547 (−2.62) | 0.188 (−7.27) |
| Add port | 0.547 (−2.62) | 0.188 (−7.27) | 0 (−∞) | 0.0513 (−12.9) |

Note: insertion losses of the multiplexer and demultiplexer at the add and drop ports, PBS's, and circulators are disregarded.

Figure 7:
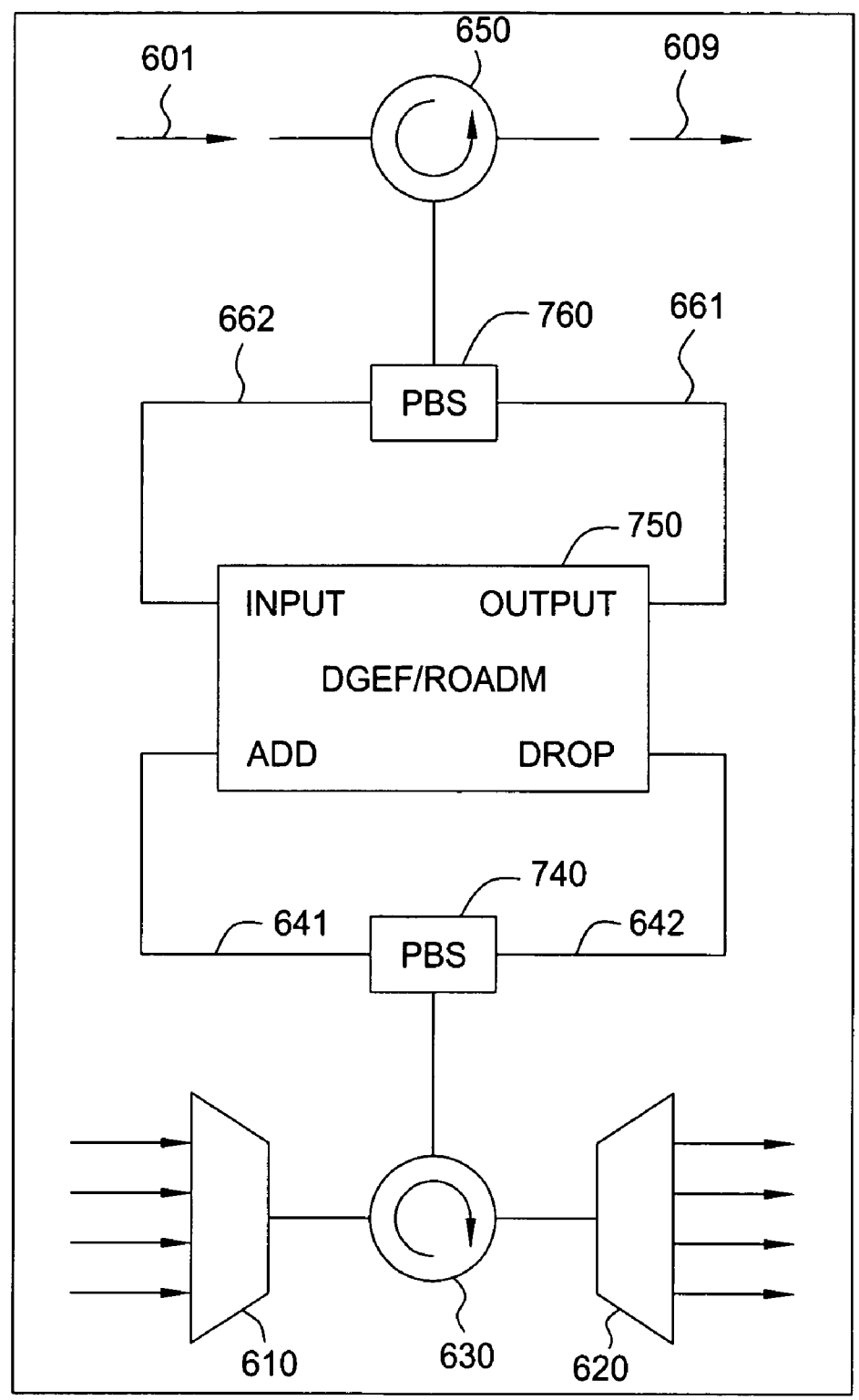
FIG. 7 depicts a block diagram illustrating a general approach for realization of polarization insensitive DGEF/ROADM designs.

FIG. 7 depicts a block diagram illustrating a general approach for realization of polarization insensitive DGEF/ROADM designs. Depending on the chip technology used, the designs depicted in FIG. 2 thru FIG. 5 can be polarization sensitive. The embodiment shown in FIG. 7 is a polarization insensitive arrangement.

The embodiment of FIG. 7 includes an optical multiplexer 610, an optical demultiplexer 620, a counter-clockwise circulator 650, a clockwise circulator 630, a third PBS 760, a fourth PBS 740, and a DGEF/ROADM block 750. The DGEF/ROADM block 750 could comprise any one of the embodiments of FIG. 2, FIG. 3, FIG. 4, or FIG. 5 without the optical multiplexer (210, 410, 510) and optical demultiplexer (220, 420, 520.) The DGEF/ROADM block includes input, output, add and drop ports that correspond to those ports in FIG. 2, FIG. 3, FIG. 4, and FIG. 5. The orthogonal polarizations of the PBS's (740, 760) are coupled to the same axis of the waveguides.

The counter-clockwise circulator 650 of FIG. 7 functions substantially the same as the counter-clockwise circulator of FIG. 6. The third PBS 760 is connected to the counter-clockwise circulator in FIG. 7. The input signal 601 is circulated to the third PBS 760. The third PBS 760 splits the input 601 signal received at the first circulator 650 and propagates two orthogonal polarized signals on two fibers 661, 662. Fiber 661 connects the right port of the third PBS 760 to the output of the DGEF/ROADM block 750. Fiber 662 connects the left port of the third PBS 760 to the input of the DGEF/ROADM block 750. The signals received by the third PBS 760 from the DGEF/ROADM 750 are combined and circulated to the output 609.

The clockwise circulator 630 of FIG. 7 functions substantially the same as the clockwise circulator in FIG. 6. It receives a WDM signal including a plurality of optical signals that is multiplexed by the optical multiplexer 610 of FIG. 7 that functions substantially the same as the multiplexer 610 in FIG. 6. That WDM signal is passed clockwise to the fourth PBS 740 which splits that signal into two orthogonal polarized signals on two fibers 641, 642. Fiber 641 connects the left port of the fourth PBS 740 to the add port of the DGEF/ROADM block 750. Fiber 642 connects the right port of the fourth PBS 740 to the drop port of the DGEF/ROADM block 750. The signals that are received by the fourth PBS 740 is combined and circulated to the demultiplexer 620 of FIG. 7 that functions substantially the same as the demultiplexer 620 of FIG. 6 where the signal is demultiplexed to drop the desired channels.

An alternative to polarization diversity to achieve polarization insensitivity is to use a half-wave plate inserted in the center of the DGEF chip.

While the foregoing is directed to various embodiments of the present invention, other and further embodiments of the invention may be devised without departing from the basic scope thereof. As such, the appropriate scope of the invention is to be determined according to the claims, which follow.

What is claimed is:

1. An optical add/drop multiplexer (OADM), comprising:
a first coupler, for splitting a wavelength division multiplexed (WDM) add signal into a first component WDM add signal and a second component WDM add signal;
a gain equalizing filter, for processing a WDM input signal and the first component WDM add signal to provide thereby a first component WDM output signal and second component WDM output signal; and
a second coupler, for combining the second component WDM output signal and the second component WDM add signal to produce a WDM drop signal;
wherein the first and second couplers are Y-branch couplers.

2. The OADM of claim 1, further comprising:
a multiplexer, for multiplexing a plurality of add channels to provide thereby the WDM add signal; and
a demultiplexer, for demultiplexing the WDM drop signal to provide thereby a plurality of drop channels.

3. The OADM of claim 1 wherein the gain equalizing filter has a second input port and a second output port.

4. The OADM of claim 2 wherein the multiplexer and demultiplexer are Waveguide Grating Routers (WGR).

5. The OADM of claim 1 wherein the processed WDM signal is phase shifted.

6. The OADM of claim 2 wherein said multiplexer and demultiplexer are connected to an optical circulator and said processed WDM signal is polarization rotated.

7. The OADM of claim 1 wherein the gain equalizing filter is a dynamic gain equalizing filter (DGEF).

8. The OADM of claim 1, further comprising an attenuator for attenuating the second component WDM add signal.

9. The OADM of claim 1, further comprising a mirror placed along an axis of symmetry.

10. An optical add/drop multiplexer (OADM) comprising:
a first gain equalizing filter, for processing a wavelength division multiplexed (WDM) input signal to provide thereby a first component WDM drop signal and a second component WDM drop signal; and
a second gain equalizing filter, for processing the first component WDM drop signal and a WDM add signal to provide thereby a WDM output signal;
wherein the first gain equalizing filter and the second gain equalizing filter each comprises an input coupler and an output coupler, and an output port of the output coupler of the first gain equalizing filter is configured to provide the first component WDM drop signal to an input port of the input coupler of the second gain equalizing filter;
a demultiplexer, for demultiplexing the second component WDM drop signal to provide thereby a plurality of drop channels; and
a multiplexer, for multiplexing a plurality of add channels to provide thereby the WDM add signal;
wherein the multiplexer and demultiplexer are Waveguide Grating Routers (WGR).

11. The OADM of claim 10, wherein the processed WDM signal is phase shifted.

12. The OADM of claim 10, wherein said multiplexer and demultiplexer are connected to an optical circulator and said processed WDM signal is polarization rotated.

13. The OADM of claim 10 wherein the first and second gain equalizing filters are DGEF's.

14. The OADM of claim 10, wherein at least one of the gain equalizing filter includes a non-zero offset phase shifter.

15. An optical add/drop multiplexer (OADM), comprising:
a first coupler, for splitting a wavelength division multiplexed (WDM) add signal into a first component WDM add signal and a second component WDM add signal;
a gain equalizing filter, for processing a WDM input signal and the first component WDM add signal to provide thereby a first component WDM output signal and second component WDM output signal;
a second coupler, for combining the second component WDM output signal and the second component WDM add signal to produce a WDM drop signal;
a multiplexer, for multiplexing a plurality of add channels to provide thereby the WDM add signal; and
a demultiplexer, for demultiplexing the WDM drop signal to provide thereby a plurality of drop channels;
wherein the multiplexer and demultiplexer are Waveguide Grating Routers (WGR).

16. The OADM of claim 15 wherein the first and second couplers are Y-branch couplers.

17. The OADM of claim 15 wherein the processed WDM signal is phase shifted.

18. The OADM of claim 15 wherein said multiplexer and demultiplexer are connected to an optical circulator and said processed WDM signal is polarization rotated.

19. The OADM of claim 15 wherein the gain equalizing filter is a dynamic gain equalizing filter (DGEF).

20. The OADM of claim 15, further comprising an attenuator for attenuating the second component WDM add signal.

21. The OADM of claim 15, further comprising a mirror placed along an axis of symmetry.

* * * * *